US008654386B2

(12) United States Patent
Liu et al.

(10) Patent No.: US 8,654,386 B2
(45) Date of Patent: Feb. 18, 2014

(54) METHOD AND SYSTEM FOR ENABLING DECENTRALIZED, TRUSTWORTHY AND COLLABORATIVE SHARING OF SERVICES

(75) Inventors: Hua Liu, Fairport, NY (US); Tong Sun, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 92 days.

(21) Appl. No.: 13/421,405

(22) Filed: Mar. 15, 2012

(65) Prior Publication Data

US 2013/0242340 A1    Sep. 19, 2013

(51) Int. Cl.
*G06F 3/12* (2006.01)
*G06K 15/00* (2006.01)

(52) U.S. Cl.
USPC ....... 358/1.15; 358/1.12; 358/1.13; 358/1.16; 358/1.18

(58) Field of Classification Search
USPC ...................................................... 358/1.15
See application file for complete search history.

(56) References Cited

U.S. PATENT DOCUMENTS

| | | | | |
|---|---|---|---|---|
| 6,650,433 | B1 * | 11/2003 | Keane et al. ................. | 358/1.15 |
| 7,042,585 | B1 * | 5/2006 | Whitmarsh et al. ......... | 358/1.15 |
| 2012/0002241 | A1 * | 1/2012 | Chatow et al. ............... | 358/1.15 |

OTHER PUBLICATIONS

Chung-Wei Hang et al., "Trustworthy Service Selection and Composition," ACM Transaction on Autonomous and Adaptive Systems, vol. 5, No. 4, Oct. 2010, pp. 1-18.
Amit K. Chopra et al., "Specifying and Applying Commitment-Based Business Patterns," Proc. of 10th Intl. Conf. on Autonomous Agents and Multiagent Systems, May 2-16, 2011, Taipei, Taiwan.
Amit K. Chopra et al., "Analysing Contract Robustness through a Model of Commitments," AOSE '10 Proceedings of the 11th International Conference on Agent-Oriented Software Engineering, Springer-Verlag Berlin, Heidelberg 2011.

* cited by examiner

*Primary Examiner* — Firmin Backer
*Assistant Examiner* — Henok A Shiferaw
(74) *Attorney, Agent, or Firm* — Fox Rothschild LLP

(57) ABSTRACT

Methods and systems for selecting a service provider are disclosed. Information pertaining to print service providers, including associated user and general reputation scores, are received. Each user reputation score identifies a user's perception of a print service provider's reputation. Each general reputation score identifies a general strength of the print service provider's reputation. A first set of providers is selected based on a threshold user reputation score. A second set of providers is selected (pseudo-)randomly. A trust score is determined for each provider in the first and second sets based on the associated user and general reputation scores. One or more negotiation providers are selected from the first and second sets based on the associated trust scores. One or more of the user and general reputation scores are updated for negotiation providers based on a quality of service provided or an offer provided to or by the negotiation provider.

18 Claims, 3 Drawing Sheets

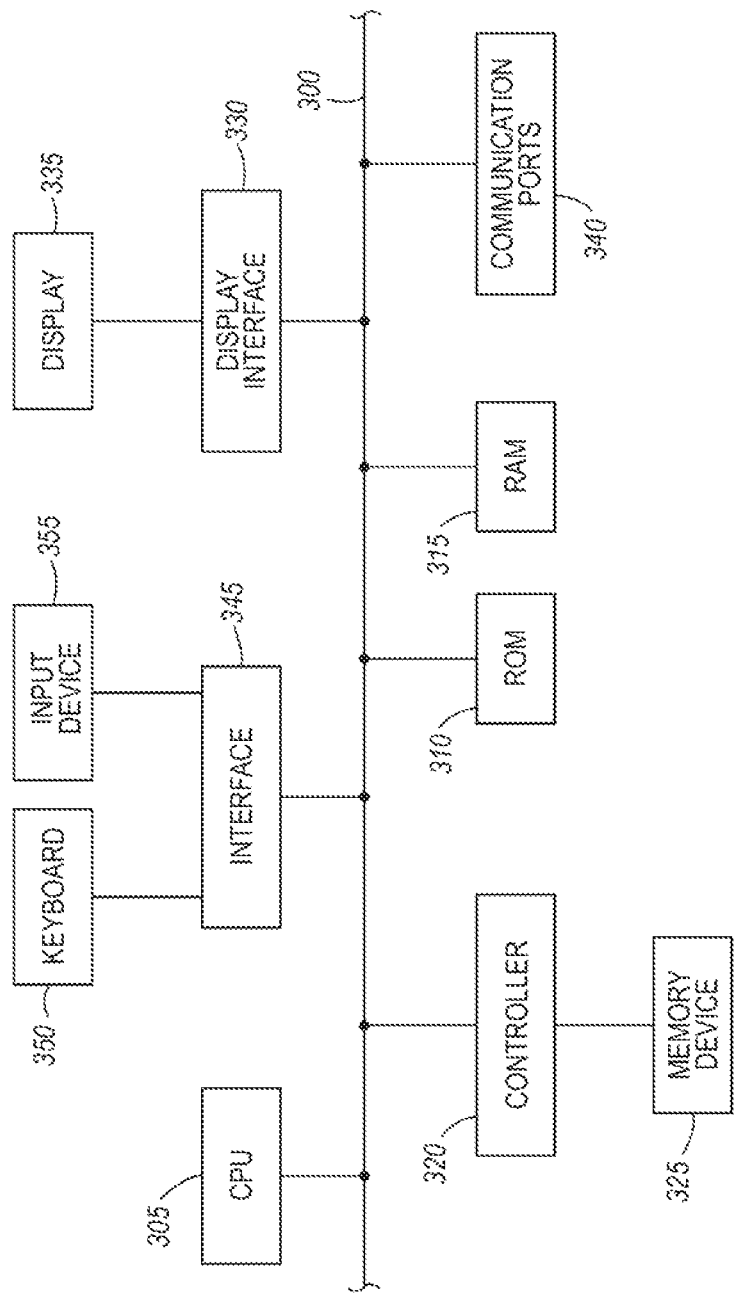

METHOD AND SYSTEM FOR ENABLING DECENTRALIZED, TRUSTWORTHY AND COLLABORATIVE SHARING OF SERVICES

BACKGROUND

Users select service providers to perform a variety of services. For example, an operation that a company does not perform as part of its day-to-day business operations can be outsourced to a service provider that specializes in performing such operation. Similarly, if a user generates a high volume of work for a particular task, it may be more cost efficient to use a service provider than to purchase the equipment and staff necessary to perform the task.

In the provision of business services, trust can be defined as a subjective probability by which a user expects to use a service provider for performing a particular service. Trust, therefore, identifies a comfort level that a user has with a service provider. Alternately, contract can be defined as an agreement between a user and a service provider by which a service is committed to meet the user's expectations. As such, contract refers to a commitment between a user and a service provider.

One problem with identifying a service provider for a service is that a user may use a particular service provider that is not the best service provider for a particular service because of institutional inertia. Moreover, some service providers have difficulty breaking into or expanding their presence in a market even if the services that they perform are of high utility (based on price, quality or a number of other metrics) because of a lack of name recognition.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system for selecting a print service provider may include a computing device, and a non-transitory computer-readable medium in operable communication with the computing device. The computer-readable medium contains one or more programming instructions that, when executed, cause the computing device to receive information pertaining to a plurality of print service providers including an associated user reputation score identifying a strength of a reputation of the print service provider with respect to a user and an associated general reputation score identifying a strength of a reputation of a print service provider among a plurality of users, select first and second sets of print service providers from the plurality of print service providers, where each of the first set of print service providers has an associated user reputation score that exceeds a threshold value and each of the second set of print service providers are randomly or pseudo-randomly selected from the plurality of print service providers, determine a trust score for each of the print service providers in the first and second sets of print service providers based on the user reputation score and the general reputation score associated with the associated print service provider, select one or more negotiation print service providers from the first set and second set of print service providers based on the associated trust scores for the print service providers, and update one or more of the associated general reputation score and the associated user reputation score for each of the one or more negotiation print service providers based on one or more of a quality of a service provided to the user by the negotiation print service provider, an offer provided to a negotiation print service provider, and an offer provided by the negotiation print service provider.

In an embodiment, a method of selecting a print service provider may include receiving information pertaining to a plurality of print service providers including an associated user reputation score identifying a strength of a reputation of the print service provider with respect to a user and an associated general reputation score identifying a strength of a reputation of a print service provider among a plurality of users, selecting first and second sets of print service providers from the plurality of print service providers, where each of the first set of print service providers has an associated user reputation score that exceeds a threshold value and where each of the second set of print service providers are randomly or pseudo-randomly selected from the plurality of print service providers, determining a trust score for each of the print service providers in the first and second sets of print service providers based on the user reputation score and the general reputation score associated with the associated print service provider, selecting one or more negotiation print service providers from the first set and second set of print service providers based on the associated trust scores for the print service providers, and updating one or more of the associated general reputation score and the associated user reputation score for each of the one or more negotiation print service providers based on one or more of a quality of a service provided to the user by the negotiation print service provider, an offer provided to a negotiation print service provider, and an offer provided by the negotiation print service provider.

BRIEF DESCRIPTION OF THE DRAWINGS

FIG. 3 depicts a block diagram of illustrative internal hardware that may be used to contain or implement program instructions according to an embodiment.

DETAILED DESCRIPTION

Figure 1:
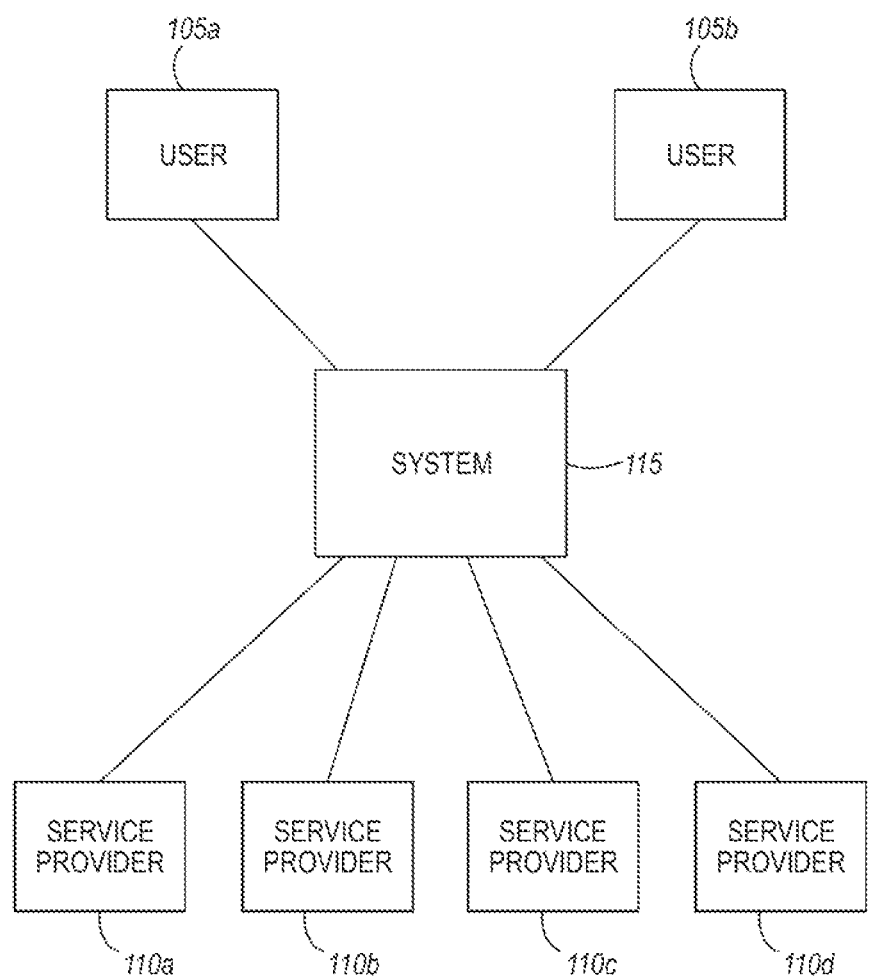
FIG. 1 depicts a block diagram of an exemplary user-service provider network according to an embodiment.

The following terms shall have, for the purposes of this application, the respective meanings set forth below.

A "computing device" refers to a computer, a processor and/or any other component, device or system that performs one or more operations according to one or more programming instructions. An illustrative computing device is described in reference to FIG. 3.

As used herein, the terms "sum," "product" and similar mathematical terms are construed broadly to include any method or algorithm in which a single datum is derived or calculated from a plurality of input data.

"Contract" refers to an agreement between a user and a service provider by which a service is committed to meet the user's expectations. As such, a contract refers to a commitment between a user and a service provider.

A "general reputation score" refers to a value pertaining to a perception of an entity by a plurality of individuals or users.

A "negotiation print service provider" refers to a print service provider that is intended to receive at least one offer from a user for a particular print service.

A "negotiation service provider" refers to a service provider that is intended to receive at least one offer from a user for a particular service.

A "print service provider" refers to an entity that performs one or more print services for a user.

A "service" refers to one or more operations. Illustrative services may include, without limitation, printing, copying, binding, delivering materials, procurement, production, and the like.

A "service provider" refers to an entity that performs one or more services for a user. A service provider may generally perform, for example and without limitation, print services, copy services, construction services, delivery services, and/or any other types of services.

"Trust" refers to a subjective probability by which a user expects to use a service. As such, trust refers to a subjective comfort level that a user has with a service provider.

A "trust score" refers to a value pertaining to an overall reputation associated with a particular service provider for a particular user. A trust score associated with a service provider may be determined using at least a general reputation score and a user reputation score. Each of the general reputation score and the user reputation score may be assigned a relative weight when determining the corresponding trust score.

An "user reputation score" refers to a value pertaining to a perception of an entity by an individual or user.

The methods and systems disclosed herein combine trust and contract to achieve workload balance and customer satisfaction. The methods and systems evaluate trust based on a particular user's personal experiences with a service provider and recommendations from other users. Moreover, the methods and systems identify negotiation strategies that are applied in contract conversations with service providers. Interactions between users and service providers, including negotiations and/or the performance of services, are incorporated into service trust ratings.

FIG. 1 depicts a block diagram of an exemplary user-service provider network according to an embodiment. As shown in FIG. 1, at least one user, such as 105a-b, and a plurality of service providers, such as 110a-d, may be in communication with a system 115 for selecting a service provider for a service. The selection system 115 may store information pertaining to each service provider 110 such as a general reputation score for the service provider and a plurality of user experience scores pertaining to the experience of each user 105 with the service provider (if any). In an embodiment, the information may include a set of scores and time information, such as a time stamp, corresponding to each score. Using such information may allow for a weighting to be applied to corresponding to the time at which a particular score was recorded. Additional and/or alternate information may also be stored within the scope of this disclosure.

The system 115 may permit additional users 105 and/or service providers 110 intermittently or periodically by storing information pertaining to each user or service provider. In particular, a new service provider 110 may provide a list of services that the service provider is willing to perform. In such a manner, the system 115 may enable the service provider 110 to be considered for future service requests.

A user 105 may request a list of service providers 110 for a particular service from the system 115. The system 115 may determine a plurality of service providers 110 to provide to the user 105 based on the teachings disclosed herein.

Once one or more service providers 110 are selected, a user 105 may contact each service provider directly. Alternately, the system 115 may permit the user 105 to contact a service provider 110 through the system itself.

The users 105 and/or service providers 110 may be connected to the system 115 via a communication link, such as a computer network including one or more of the Internet, a local area network, a wide area network, a telephone network, and/or the like. Other means of communicating among the users 105, the service providers 110 and the system 115 may also be performed within the scope of this disclosure.

Figure 2:
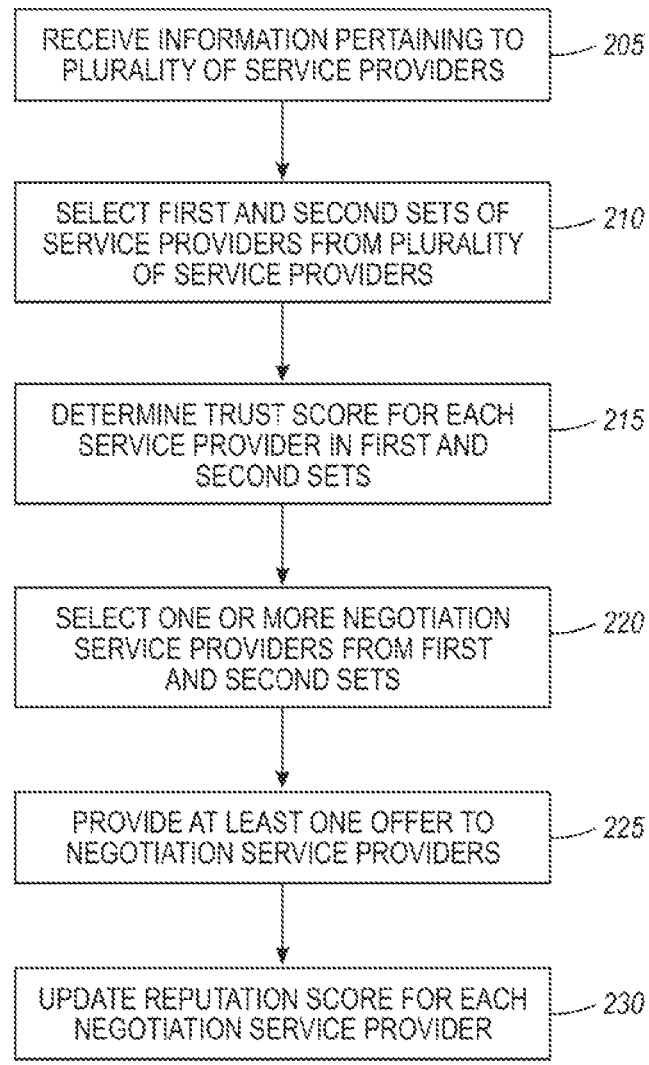
FIG. 2 depicts a flow diagram of an illustrative method of selecting a service provider for a service according to an embodiment.

FIG. 2 depicts a flow diagram of an illustrative method of selecting a service provider for a service according to an embodiment. As depicted in FIG. 2, information pertaining to a plurality of service providers may be received 205 by a computing device. The information may include, for each service provider, a user reputation score associated with the service provider and a general reputation score associated with the service provider.

The user reputation score may identify a strength of reputation of the service provider with respect to the user requesting the service. In an embodiment, the user reputation score may be determined based on the following equation:

$$R_u = \sum_{j=0}^{k} \left(\frac{R_{u,t_j}}{t - t_j}\right),$$

where $R_u$ is the weighted average user reputation score for a particular service provider; $R_{u,t_j}$ represents the average service rating at the time interval between time $t_j$ and time $t_{j+1}$. As such, the user reputation score may equal a sum of, for each of a plurality of time intervals, a product of an average user reputation score for the service provider for the time interval and a weight associated with the time interval.

The general reputation score may identify a strength of reputation for the service among a plurality of users. In an embodiment, the general reputation score may be determined based on the following equation:

$$R_e = \sum_{i=0}^{k} \left(\frac{R_{e,t_i}}{t - t_i}\right),$$

where $R_e$ is the weighted average general reputation for a particular service provider; $R_{e,t_i}$ represents the average service rating at the time interval between time $t_i$ and time $t_{i+1}$. As such, the general reputation score may equal a sum of, for each of a plurality of time intervals, a product of an average general reputation score for the service provider for the time interval and a weight associated with the time interval.

First and second sets of service providers may be selected 210 from the plurality of service providers by the computing device. In an embodiment, each of the first set of service providers may be selected 210 using the associated user reputation score. For example, each service provider in the first set of service providers may have a user reputation score that exceeds a threshold value (i.e., has a high reputation for a user). In an embodiment, each of the second set of service providers may be randomly or pseudo-randomly selected 210 from the plurality of service providers. In an embodiment, each of the second set of service providers may be selected 210 from service providers having a user reputation score that does not exceed the threshold value.

In an embodiment, the first and second set of service providers may be selected 210 by identifying a distribution between the first and second set of service providers. The distribution may include a first percentage and a second percentage. The first percentage may represent a percentage of the total number of service providers to be selected 210 that are to be in the first set of service providers. The second percentage may represent a percentage of the total number of service providers to be selected 210 that are to be in the second set of service providers. The sum of the first percentage and the second percentage may equal 100%. The first set of service providers may be selected based on the first percentage, and the second set of service providers may be selected based on the second percentage. In an embodiment, selecting 210 the first and second sets of service providers may include receiving the first and second percentages by the computing device from a user.

The values for the first and second percentages may be adjusted based on one or more factors. For example, the values of the first and second percentages may be adjusted based on the maximal duration of the negotiation process and/or the requested evaluation frequency of a low-reputation or new service provider.

A trust score may be determined 215 for each of the service providers in the first and second set of providers by the computing device. The trust score may be determined 215 based on the user reputation score and the general reputation score associated with the associated service provider. In an embodiment, the user may calculate the trust scores for service providers performing a service using the following formula: $R=(1-\alpha)R_e+\alpha R_u$, where $R_e$ represents the weighted average reputation for a particular service provider, and $R_u$ represents the user's personal experience with the service provider. As such, determining 215 the trust score for each of the service providers in the first and second sets of service providers may include summing a product of the user reputation score and a first weight and a product of the general reputation score and a second weight.

In an embodiment, the value for $\alpha$ may be configurable depending on whether a particular user favors reputation or personal experience. In an embodiment, heuristic rules may be applied to automatically adjust the value for $\alpha$. For example, if a user's experience with a service provider consistently differs from the general reputation for the service provider, the value for $\alpha$ may be decreased. Similarly, the value for $\alpha 0$ may be increased if a user consistently agrees with a service provider's reputation.

One or more negotiation service providers may be selected 220 from the first and second sets of service providers by the computing device based on the associated trust scores for the service providers. For example, service providers having trust scores greater than a threshold value may be selected 220 as negotiation service providers.

In an embodiment, at least one offer may be provided 225 to the negotiation service providers. The offer to be provided 225 may be determined based on one or more of one or more quality of service variables, one or more quality of service weights, and one or more quality of service incremental changes. Each of the quality of service weights and quality of service incremental changes may be associated with a corresponding quality of service variable. In other words, at each of one or more negotiation iterations, a user may use the following equation to determine an offer: $O=W*Q^T*\Delta W^T$, where Q is a vector of quality of service variables, such as cost and response time; W is a quality of service weight vector for the quality of service variables; and $\Delta W$ is a vector of the quality of service incremental changes that are applied at each negotiation iteration. In an embodiment, W may be determined by the user. If a quality of service variable has a high weight, the user may have less negotiation space for the particular quality of service variable.

In an embodiment, at negotiation iteration i, $\Delta W_i$ may be determined by applying a probability based incremental change in $\Delta W_{i-1}$. In an embodiment, the probability may be based on two factors: (1) $\Delta W_{i-1}$ and (2) the service provider's offer at negotiation iteration i-1, which may be denoted as $S_{i-1}$. This probability may be modeled as a constrained multi-dimension optimization problem in which elements with larger values in $\Delta W_{i-1}$ are less likely to be changed (constraints), and multiple elements with smaller values in $\Delta W_{i-1}$ may be adjusted to find the $\Delta W_i$ which results in the smallest distance form $O_i$ to $S_{i-1}$. The likelihood of adjustment for these elements may be inversely proportional to the element values in W. Conventional linear programming algorithms may be applied here to determine $\Delta W_i$.

A negotiation iteration may be terminated when either a mutually agreed contract is reached or at least one of the elements in $\Delta W$ reaches its boundary. In the latter case, the user may not be able to further negotiate within the user's parameters, so the negotiation with the particular service provider may end without a mutually agreed contract.

A reputation score for each of the one or more negotiation service providers may be updated 230. In an embodiment, the reputation score may be updated 230 based on one or more of a quality of a service provided to the user by the negotiation service provider, an offer provided to a negotiation service provider, and an offer provided by the negotiation service provider.

In an embodiment, the reputation score may be updated 230 for a negotiation service provider that performs a service for the user based on a quality of the service that is performed. For example, a service provider that is selected may receive a user rating after usage ($p_{j,t_1}$), which contributed to the service rating at the corresponding interval. In an embodiment, the reputation score may be updated 230 for a negotiation service provider that does not perform a service for the user based on a quality of a negotiation process between the user and the negotiation service provider. For example, a service provider that is not selected may receive a rating after the negotiation process unsuccessfully completes ($q_{j,t_1}$). The rating for the service provider may then be normalized by all of the service ratings in a particular time interval $$\left(\sum_{j=0}^{n} R_{ej,t_1}\right).$$

The average reputation score of the service provider at time $t_1$ may be computed using the following equation:

$$R_{e,t_1} = \frac{\sum_{j=0}^{x} p_{j,t_1} + \beta \sum_{j=0}^{y} q_{j,t_1}}{\sum_{j=0}^{n} R_{ej,t_1}},$$

where $q_{j,t_1}$ is inversely proportional to the distance between the final offers of the service provider and the user. For example, $q_{j,t_1}$ may be relatively larger if the final offer from the user is close to the final offer from the service. β may be used to adjust the relative weighting of the negotiation score in determining the service provider reputation score.

In an embodiment, the user's personal experience score for time interval $t_1$ may be determined as follows:

$$R_{u,t_1} = \begin{cases} p_{j,t_1} & \text{if the user used the service} \\ q_{j,t_1} & \text{if the user negotiated but did not use the service.} \end{cases}$$

FIG. 3 depicts a block diagram of illustrative internal hardware that may be used to contain or implement program instructions, such as the process steps discussed above in reference to FIG. 2, according to embodiments. A bus 300 serves as the main information highway interconnecting the other illustrated components of the hardware. CPU 305 is the central processing unit of the system, performing calculations and logic operations required to execute a program. CPU 305, alone or in conjunction with one or more of the other elements disclosed in FIG. 3, is an illustrative processing device, computing device or processor as such terms are used within this disclosure. Read only memory (ROM) 310 and random access memory (RAM) 315 constitute illustrative memory devices (i.e., processor-readable non-transitory storage media).

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 310 and/or the RAM 315. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 330 may permit information from the bus 300 to be displayed on the display 335 in audio, visual, graphic or alphanumeric format. Communication with external devices, such as a print device, may occur using various communication ports 340. An illustrative communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for selecting a print service provider, the system comprising:
a computing device; and
a non-transitory computer-readable medium in operable communication with the computing device, wherein the computer-readable medium contains one or more programming instructions that, when executed, cause the computing device to:
receive information pertaining to a plurality of print service providers, wherein the information for each print service provider comprises an associated user reputation score identifying a strength of a reputation of the print service provider with respect to a user and an associated general reputation score identifying a strength of a reputation of a print service provider among a plurality of users;
identify a distribution which comprises a first size for a first set of print service providers, and a second size for a second set of print service providers;
select the first set of print service providers from the plurality of print service providers based on the first size, and select the second set of print service providers from the plurality of print service providers based on the second size, wherein each of the first set of print service providers has an associated user reputation score that exceeds a threshold value, wherein each of the second set of print service providers are randomly or pseudo-randomly selected from the plurality of print service providers;
determine a trust score for each of the print service providers in the first and second sets of print service providers, wherein each trust score is based on the user reputation score and the general reputation score associated with the associated print service provider;
select one or more negotiation print service providers from the first set and second set of print service providers based on the associated trust scores for the print service providers; and
update one or more of the associated general reputation score and the associated user reputation score for each of the one or more negotiation print service providers based on one or more of a quality of a service provided to the user by the negotiation print service provider, an offer provided to a negotiation print service provider, and an offer provided by the negotiation print service provider.

2. The system of claim 1, wherein
the first size is a first percentage of a total number of selections for the first set of print service providers and the second size is a second percentage of a total number of selections for the second set of print service providers, wherein a sum of the first and second percentages equals 100%.

3. The system of claim 1, wherein the one or more programming instructions that further comprise one or more programming instructions that, when executed, cause the computing device to receive the first and second sizes from a user.

4. The system of claim 1, wherein the one or more programming instructions that, when executed, cause the computing device to determine the trust score for each of the print service providers in the first and second sets of print service providers comprise one or more programming instructions that, when executed, cause the computing device to sum a product of the associated user reputation score and a first weight and a product of the associated general reputation score and a second weight.

5. The system of claim 1, wherein each associated general reputation score is equal to a sum of, for each of a plurality of time intervals, a product of an average general reputation score for the print service provider for the time interval and a weight associated with the time interval.

6. The system of claim 1, wherein each associated user reputation score is equal to a sum of, for each of a plurality of time intervals, a product of an average user reputation score for the print service provider for the time interval and a weight associated with the time interval.

7. The system of claim 1, wherein the one or more programming instructions further comprise one or more programming instructions that, when executed, cause the computing device to provide an offer to the negotiation print service providers, wherein the offer is determined based on one or more of one or more quality of service variables, one or more quality of service weights, and one or more quality of service incremental changes, wherein each of the quality of service weights and quality of service incremental changes are associated with a corresponding quality of service variable.

8. The system of claim 1, wherein the one or more programming instructions that, when executed, cause the computing device to update one or more of the associated general reputation score and the associated user reputation score comprise one or more programming instructions that, when executed, cause the computing device to update the associated user reputation score for a negotiation print service provider that performs a service based on a quality of the service that is performed for the user.

9. The system of claim 1, wherein the one or more programming instructions that, when executed, cause the computing device to update one or more of the associated general reputation score and the associated user reputation score comprise one or more programming instructions that, when executed, cause the computing device to update the associated general reputation score for a negotiation print service provider that does not perform a service based on a quality of a negotiation process between the user and the negotiation print service provider.

10. A method of selecting a print service provider, the method comprising:
receiving, by a computing device, information pertaining to a plurality of print service providers, wherein the information for each print service provider comprises an associated user reputation score and an associated general reputation score, wherein each user reputation score identifies a strength of a reputation of the associated print service provider with respect to a user, wherein each general reputation score identifies a strength of a reputation of the associated print service provider among a plurality of users;
identifying, by the computing device, a distribution comprising a first size for a first set of print service providers, and a second size for a second set of print service providers;
selecting, by the computing device, the first set of print service providers from the plurality of print service providers based on the first size, and the second set of print service providers from the plurality of print service providers based on the second size, wherein each of the first set of print service providers has an associated user reputation score that exceeds a threshold value, wherein each of the second set of print service providers are randomly or pseudo-randomly selected from the plurality of print service providers;
determining, by the computing device, a trust score for each of the print service providers in the first and second sets of print service providers, wherein the trust score is determined based on the user reputation score and the general reputation score associated with the associated print service provider;
selecting, by the computing device, one or more negotiation print service providers from the first set and second set of print service providers based on the associated trust scores for the print service providers; and
updating, by the computing device, one or more of the associated general reputation score and the associated user reputation score for each of the one or more negotiation print service providers based on one or more of a quality of a service provided to the user by the negotiation print service provider, an offer provided to a negotiation print service provider, and an offer provided by the negotiation print service provider.

11. The method of claim 10, wherein
the first size is a first percentage of a total number of selections for the first set of print service providers and the second size is a second percentage of a total number of selections for the second set of print service providers, wherein a sum of the first and second percentages equals 100%.

12. The method of claim 10, wherein selecting the first and second sets of print service providers further comprises receiving, by the computing device, the first and second sizes from a user.

13. The method of claim 10, wherein determining the trust score for each of the print service providers in the first and second sets of print service providers comprises summing a product of the associated user reputation score and a first weight and a product of the associated general reputation score and a second weight.

14. The method of claim 10, wherein the associated general reputation score is equal to a sum of, for each of a plurality of time intervals, a product of an average general reputation score for the print service provider for the time interval and a weight associated with the time interval.

15. The method of claim 10, wherein the associated user reputation score is equal to a sum of, for each of a plurality of time intervals, a product of an average user reputation score for the print service provider for the time interval and a weight associated with the time interval.

16. The method of claim 10, further comprising:
providing an offer to the negotiation print service providers, wherein the offer is determined based on one or more of one or more quality of service variables, one or more quality of service weights, and one or more quality of service incremental changes, wherein each of the quality of service weights and quality of service incremental changes are associated with a corresponding quality of service variable.

17. The method of claim 10, wherein updating one or more of the associated general reputation score and the associated user reputation score comprises updating the associated user reputation score for a negotiation print service provider that performs a service based on a quality of the service that is performed for the user.

18. The method of claim 10, wherein updating one or more of the associated general reputation score and the associated user reputation score comprises updating the associated general reputation score for a negotiation print service provider that does not perform a service based on a quality of a negotiation process between the user and the negotiation print service provider.

* * * * *